United States Patent Office 2,962,527
Patented Nov. 29, 1960

2,962,527

PURIFICATION OF DIBASIC ACIDS

Harry Chafetz, Poughkeepsie, Elmer E. Schallenberg and John T. Nolan, Beacon, and John A. Patterson, Fishkill, N.Y., assignors to Texaco Inc., a corporation of Delaware No Drawing. Filed Dec. 24, 1957, Ser. No. 704,888

5 Claims. (Cl. 260—537)

The instant invention relates to purification of $C_{4+}$ dibasic acids of the oxalic acid series. It is specially adapted for purification of such acid or acids in crude mixture with contaminants, e.g., monobasic acids and/or those contaminants having non-carboxylic oxygen.

The dibasic acids concerned herein are succinic, glutaric, adipic, pimelic, suberic, azelaic, sebacic and higher acids of this series, $(CH_2)_n(COOH)_2$ where $n$ is an integer of a value of at least 2. Their esters are useful as plasticizers, synthetic lubricants, and the like; they are useful in mixtures or as individual compounds; particularly commercially important is adipic acid used in the manufacture of nylon 66.

A crude mixture containing one or more, and usually a complex mixture of a plurality of the $C_{4+}$ dibasic acids of the oxalic acid series and said oxygenated contaminants can be made in a number of ways, for example, by oxidation of paraffinic and or isoparaffinic hydrocarbons, e.g., refined wax, semi-refined wax, petrolatum, lubricating oil, slack wax, scale wax, foots-oil and the like, with air, hydrogen peroxide, nitric acid, chromic acid, ozone, or a mixture or succession of these oxidizing agents. Preferably the crude mixture is made by a two-stage process wherein a macrocrystalline paraffin wax is oxidized with air, usually in the presence of a metalliferous oxidation catalyst such as a manganese salt, until the saponification number of the mixture attains at least 200 and, advantageously, 300 to 600; thereafter the air oxidate is agitated intensively with nitric acid at a temperature between 180° and 450° F. for at least about one minute.

Alternatively, the wax can be oxidized in a single stage with air or other oxygen-containing gas, and the bulk of the dibasic acids extracted from the oxidate with water, or a lower molecular weight (e.g., $C_1$–$C_3$) alkanol, or an aqueous solution of mineral acid such as hydrochloric, sulfuric, or the like (and subjected to acid hydrolysis to break up esters, if desired). Metal salts can be removed from the aqueous extract solution as hereinafter described, and the water or other solvent removed to leave a dark-colored residue of crude dibasic acids suitable for treatment by our process.

Other ways of making such useful crude mixtures containing one or more of said dibasic acids are: oxidation of levulinic acid with molecular oxygen in the presence of a metalliferous oxidation catalyst; oxidation of ketones such as cyclohexanone with nitric acid; oxidation of alcohols such as cyclohexanol with nitric acid; oxidation of cycloparaffins such as cyclopentane with nitric acid, oxidation of unsaturated fatty acids such as oleic acid, cotton seed fatty acid, or linseed fatty acid or their glycerides with nitric acid or ozone; oxidation of Fischer-Tropsch and oxo products, e.g., with nitric acid; and oxidation of hydroxy acids such as hydroxy stearic acid or glycerides thereof with nitric acid.

In these processes, particularly in the oxidation of the aforesaid aliphatic hydrocarbons or the unsaturated fatty acids with nitric acid and/or molecular oxygen, a complex crude mixture of dibasic acid products and contaminants having non-carboxylic oxygen results, the contaminants generally being objectionable because they give the crude a bad odor and a dark color. Monobasic acids are also present.

Heretofore, it has been proposed to use distillation or fractional crystallization from solvents for the purification of crude mixtures of one or more of these dibasic acids from monobasic acids, particularly $C_{1-10}$ monobasic acids, and associated contaminants having non-carboxylic oxygen, e.g., alcohols, esters, ketones, lactones, nitrated hydrocarbons, tars, aldo acids, keto acids, and hydroxy acids. Advantages of our process over prior processes include economy, simplicity, and brevity.

Broadly our process for separating $C_{4+}$ dibasic acids of the oxalic acid series from contaminants having non-carboxylic oxygen comprises contacting said mixture with liquid phase $SO_2$, and thereafter separating the resulting magma into an extract fraction and a purified dibasic acid fraction.

Advantageously the operation is done at temperature between minus 30° and plus 100° F., but temperature as low as minus 50° F. or lower and as high as about plus 200° F. can be used, providing that superatmospheric pressure vessels are used when operating at temperature above the atmospheric boiling point of sulfur dioxide (14° F.). For efficiency and economy operation at atmospheric pressure and about 14° F. or lower is preferred.

The contacting of the crude mixture with liquid sulfur dioxide can be done in a single treatment, a series of treatments, or a continuous operation such as a continuous countercurrent extraction similar to that employed, for example, in the purification of precipitated chalk and the like. Ordinarily the weight ratio of liquid sulfur dioxide to total crude mixture containing the subject dibasic acids will be between about ½:1 and about 12:1, but more or less $SO_2$ can be used depending upon the proportion of impurities present and the degree of product (dibasic acid) purity desired. When using the crude mixture from the preferred source we find that a single treatment of the crude with about one to three times its weight of liquid sulfur dioxide is usually adequate for producing a free-flowing, white, crystalline dibasic acid fraction of high purity. However, in larger scale operation, a series of lixiviations or extractions can be used for overall economy of sulfur dioxide.

The preferred source of crude dibasic acid mixture is one containing in the main, as dibasic acids, succinic, glutaric, and adipic acid from the air and nitric acid oxidation of macrocrystalline paraffin wax, described hereinbefore. In such process an aqueous phase containing practically all the dibasic acids separates by gravity from an oily phase after the nitric acid oxidation step. Weight proportion of specific dibasic acids in this aqueous layer is approximately as follows: 20 to 35% succinic ($C_4$); 15 to 25% glutaric ($C_5$); 15 to 25% adipic ($C_6$); 5 to 15% pimelic ($C_7$); and 5 to 25% suberic ($C_8$) and higher.

This aqueous phase is preferably treated with an ion exchanger to remove metal ions which would otherwise be retained in the dibasic acid fraction finished goods from our process. The useful cation exchangers are insoluble substances having sulfonic acid groups. They can be prepared from a natural product such as coal by reacting with a sulfonating agent, e.g., sulfuric acid, sulfur trioxide, or chlorosulfonic acid. They can also be made from phenol-formaldehyde resins which have been sulfonated in the rings or which contain omega sulfonic groups introduced by reaction of formaldehyde and a sulfite. Also suitable are resins prepared by sulfonating co-polymers of styrene and polyvinylbenzene. If the cation exchangers are purchased in a salt form they can be readily converted into their hydrogen form for use in our process by treating them with a dilute solution of a strong mineral acid such as hydrochloric or sulfuric acid.

Suitable cation exchange resins for removal of metal salts in the foregoing aqueous dibasic acid solution include Amberlite IR-120 (the trade name for a high density, strongly acidic nuclear sulfonic acid cation exchange resin made by the Rohm & Haas Company) or Dowex 50 (the trade name of a similar strongly acidic cation exchange resin made by the Dow Chemical Company).

Substantially all the water and nitric acid are removed from said aqueous layer containing dibasic acids by distillation, preferably at reduced pressure of less than 300 mm. Hg absolute. This also removes lower molecular weight monobasic acids and leaves a dark-colored residue (frequently oily at room temperature) of crude dibasic acids contaminated principally with materials having non-carboxylic oxygen.

This dirty residue is then extracted with the liquid $SO_2$ using intimate contacting between the $SO_2$ and the residue, preferably with mechanical agitation in a corrosion-resistant vessel, e.g., glass, glass-lined steel, an austenitic stainless steel, or the like. There is formed an extract fraction containing practically all the impurities plus a small amount of the dibasic acids. The extract fraction is easily separated from the insoluble fraction of purified dibasic acids by filtration, decanting, and/or centrifuging. The purified insoluble dibasic acid fraction can be rinsed with a small amount of additional liquid sulfur dioxide to remove occluded liquors. The purified dibasic acid fraction so obtained can be rid of sulfur dioxide most simply by allowing it to warm to room temperature at atmospheric pressure. There results a mass of free-flowing, white, crystalline dibasic acids, predominantly succinic and adipic.

Additionally, we have found that when a sufficient proportion of liquid sulfur dioxide is used in the lixiviation of the crude mixture, e.g., at least about one part of sulfur dioxide per part of the residue being treated, glutaric acid and higher odd-numbered dibasic acids present tend to be extracted into the liquid sulfur dioxide preferentially to their other dibasic acid homologues, perhaps assisted in this case by the various oxygenated impurities in or going into solution. Accordingly, we can produce a mixed dibasic acid fraction having a ratio of odd-numbered dibasic acids to the other dibasic acids lower than originally present in the crude mixture, and even remove virtually all the odd-numbered dibasic acids from the crude mixture. This is assisted by use of multiple sulfur dioxide treatments or by a continuous countercurrent treatment with about 5-10 parts of liquid sulfur dioxide total per part of the initial crude mixture, i.e., the residue from distillation of the water and nitric acid.

The following examples show various ways in which our invention has been practiced but should not be construed as limiting the invention. All parts indicated are parts by weight, and all percentages are weight percentages unless otherwise noted. Temperatures are in degrees Fahrenheit, and pressures are in pounds per square inch gauge.

*Example 1.*—A mixture of crude dibasic acids was prepared by air-oxidizing petroleum wax to a saponification number of 504 in the presence of potassium permanganate catalyst, further oxidizing this air oxidate with 8.2 parts of 10.6% nitric acid per part of wax oxidate at a temperature of 305-355° F., separating the resulting aqueous phase from the resulting oily phase, and stripping off the preponderance of the water, nitric acid, and other low-boiling components from said resulting aqueous phase by distillation at a pressure of about 50-100 mm. Hg absolute. The proportions of specific dibasic acids in the brown, somewhat oily, crystalline residue from this vacuum distillation were: 27% succinic, 18% glutaric, 13% adipic, 8% pimelic, and 11% suberic and higher. There was also 4% water and 19% associated impurities, and the neutralization number of the residue was 720.

20 grams of these crude acids were twice extracted with stirring at atmospheric pressure using successive 59 gram portions of liquid sulfur dioxide, the temperature of extraction being 5-13° F. The extract phases were separated from the sulfur dioxide-insoluble material by filtration through a coarse fritted glass filter. During the initial extracting of the crude acids with the sulfur dioxide some brown fumes of nitrogen oxide evolved. The yellowish extract solutions were stripped of sulfur dioxide by warming to about 194° F., leaving a residue of 8.5 grams of a mixture of oil and solids which solidified upon standing to a tannish, waxy solid; this solid had a neutralization number of 658. The sulfur dioxide-insoluble material was a light-cream-colored, crystalline solid weighing 11.5 grams and having a neutralization number of 814. It analyzed 54% succinic acid, 4% glutaric acid, 19% adipic acid, 2% pimelic acid, 12% suberic and higher acids, and 9% impurities.

*Example 2.*—The following examples show the advantage of removing metal ions from the crude dibasic acid or mixture of acids prior to lixiviation with the liquid sulfur dioxide. A sample of the same mixture of crude dibasic acids used in Example 1 was dissolved in water and passed through a column of the hydrogen form of Amberlite IR-120 cation exchange resin to remove metallic impurities. A mixture of crude, yellowish, crystalline dibasic acids was recovered from the effluent by stripping it at atmospheric pressure at a temperature of about 195° F. Proportions of specific dibasic acids in this mixture were: 33% succinic, 19% glutaric, 15% adipic, 9% pimelic, 11% suberic, and higher. There was also 13% of impurities and the neutralization number of this mixture was 770.

A 20 gram portion of the ion-exchanged crude dibasic acids was extracted three times with successive 40 gram portions of liquid sulfur dioxide refluxing at atmospheric pressure. The yellowish extracts were stripped of sulfur dioxide by warming to about 194° F. to yield 9.7 grams of yellowish oil which changed upon standing into a slurry of oil and crystalline solid. This material had a neutralization number of 668 and analyzed 2.4% succinic acid, 31.3% glutaric acid, 7.4% adipic acid, 15.1% pimelic acid, and 14% suberic and higher acids, and 30% impurities. The sulfur dioxide-insoluble material was a free-flowing, white, crystalline solid of very high purity weighing 10.3 grams and having neutralization number of 880. It analyzed 66% succinic acid, 2% glutaric acid, 24% adipic, 1% pimelic, and 7% suberic and higher acids.

*Example 3.*—The table which follows illustrates the results of extracting ion-exchanged crude dibasic acids of the kind shown in Example 2 with sulfur dioxide refluxing at atmospheric pressure. The sulfur dioxide-insolubles were white, free-flowing, crystalline solids of high purity in all of the tabulated experiments.

| Run No. | Extraction | Initial Wt. of Crude Acids, Grams | Wt. of SO₂ Used, Grams | SO₂-Solubles | | SO₂-Insolubles | |
|---|---|---|---|---|---|---|---|
| | | | | Wt., Grams | Neut. No. | Wt., Grams | Neut. No. |
| 1 | first | 20 | 40 | 9.7 | 668 | 10.3 | 880 |
| | second | | 40 | | | | |
| | third | | 40 | | | | |
| 2 | first | 20 | 214 | 9.7 | 672 | 10.3 | 873 |
| | second | | 54 | 0.6 | 666 | 9.7 | |
| 3 | first | 20 | 111 | 8.9 | 663 | 11.1 | 867 |
| | second | | 55 | 1.2 | 667 | 9.9 | |
| 4 | first | 10 | 10 | 2.0 | 665 | 7.1 | 846 |
| | second | | 10 | 1.4 | 667 | 5.7 | |

*Example 4.*—A semi-refined macrocrystalline wax was oxidized to a neutralization number of 296 and saponification number of 504 by blowing with air at about 270° F. and pressure of 75 p.s.i.g. for fifteen hours in the presence of 0.4% potassium permanganate based on the initial weight of the wax. 500 grams of this oxidate was extracted four times, each time with a 500 ml. proportion of refluxing 5% aqueous HCl. Each HCl extract solution was stripped by heating it to a temperature of about 212° F. at a total pressure of about 20 mm. Hg absolute to leave the residue indicated in the following table:

| HCl Extraction Number | Weight, Grams | Appearance | Neutralization Number |
|---|---|---|---|
| 1 | 113 | brownish oil | 578 |
| 2 | 34 | brownish oil | 467 |
| 3 and 4 combined | 28.5 | dark brown oil | 426 |

The residue of the first extract solution was rinsed with water. 35 grams remained undissolved at 100° F. and was separated; the aqueous solution remaining was passed through a column of Amberlite IR-120 ion exchange resin to remove metal ions. The column of the ion-exchange resin was then rinsed with a liter of water. The so-treated extract solution and the wash water were combined. This mixture was stripped of water by heating it at 20 mm. Hg absolute using a water bath boiling at atmospheric pressure for the heat supply. 76 grams of the resulting stripped residue was extracted twice with refluxing sulfur dioxide at atmospheric pressure, 321 grams of liquid sulfur dioxide being used for the first extraction and 429 grams of liquid sulfur dioxide being used for the second extraction. The sulfur dioxide-insoluble material was a white powder weighing 17 grams and having a neutralization number of 848. The other HCl extract solutions were stripped and concentrated in a manner similar to the first one, and these stripped residues then extracted with refluxing liquid sulfur dioxide at atmospheric pressure to give the results indicated in the following table.

| Residue From HCl Extraction Number | Wt. Of Residue Used, Grams | SO₂ Extraction Number | Wt. Of SO₂ Used, Grams | SO₂-Insoluble | |
|---|---|---|---|---|---|
| | | | | Wt., Grams | Neut. No. |
| 1 | 76 | 1 | 321 | 17 | 848 |
| | | 2 | 249 | | |
| 2 | 22.0 | 1 | 337 | 2.5 | 792 |
| | | 2 | 227 | | |
| 3 and 4 combined | 20.2 | 1 | 183 | 1.8 | 670 |
| | | 2 | 128 | | |

A composite sample of the SO₂-insolubles shown in the foregoing table analyzed 60% succinic acid, 1% glutaric acid, 23% adipic acid, 1% pimelic acid, 5% suberic acid and higher acids, and 10% impurities.

*Example 5.*—This example shows experimental solubility data of various substantially pure dibasic acids in liquid SO₂. Samples of the dibasic acids were contacted with refluxing SO₂ for at least twenty minutes at atmospheric pressure. The undissolved dibasic acids were then separated from the SO₂-soluble material by filtration through a coarse fritted glass filter. The results are illustrated in the table below. Relating these data to previous examples shows the pronounced solvation effect of indigenous oxygenated impurities in a mixture of dibasic acids from the preferred source on those dibasic acids of the oxalic series present which have an odd number of carbon atoms; many of the comparatively pure acids are shown by the table to have little solubility in the liquid SO₂ at its atmospheric boiling temperature when sizable amounts of such impurities are not present.

| Acid | Wt. of Dibasic Acid Used, Grams | Wt. of Liquid SO₂ Used, Grams | Portion Soluble in SO₂ | |
|---|---|---|---|---|
| | | | Wt., Grams | Wt. Percent Basis Dibasic Acid Used |
| Succinic | 10.0 | 30 | 0 | 0 |
| Glutaric | 10.0 | 75 | 0.3 | 3.0 |
| Adipic | 10.0 | 30 | 0.05 | 0.5 |
| Pimelic | 10.0 | 30 | 0.15 | 1.5 |
| Suberic | 8 | 24 | 0.05 | 0.63 |
| Azelaic | 1.0 | 6 | 0.1 | 10 |
| Sebacic | 20 | 69 | 0.1 | 0.5 |

Further resolution of the liquid SO₂-purified dibasic acid mixtures, and particularly those wherein the glutaric and/or other dibasic acids having an odd-number of carbon atoms have been substantially removed by said prior SO₂ extraction, can be obtained by fractional extraction of an aqueous solution of the purified dibasic acids with a water-immiscible organic solvent such as methyl isobutyl ketone, n-butanol, ethyl acetate, butyl acetate, and/or methyl isopropyl ketone. Such extraction can be operated batchwise or continuously, e.g., by countercurrent liquid-liquid extraction, using as many extraction steps as are needed for desired purity.

Thus, for further example, an aqueous solution of succinic and adipic acid was extracted with methylisobutyl ketone; the two resulting insoluble liquid phases were separated. The bulk of the succinic acid was found to be in the separated water phase, and the bulk of the adipic acid was found to be in the ketone phase.

*Example 7.*—A mixture of 279 grams of tall oil fatty acids diluted with an equal weight of hexanoic acids was ozonized with ozone at 30° C. to the extent that 87% of the calculated double bonds present in the tall oil fatty acids were ozonized, basis ozone consumed. The product, weighing 610 grams, was blown with oxygen between 70 and 100° C. to decompose the so-formed ozonides into a mixture of product acids in hexanoic acids diluent. The resulting blown mixture weighed 600 grams and had a neut. No. of 461. The hexanoic acids were stripped from the crude product, the stripping being terminated when the distilling head temperature of 94° C. at 5 mm. Hg absolute was reached, leaving 406 grams of residue having a neut. No. of 449.

The stripped residue was allowed to crystallize partially on standing, 200 grams of said crystals being recovered by filtration, the wet recovered crystals having a neut. No. of 483. The wet crystals were extracted five times with liquid $SO_2$ at its atmospheric boiling point. The table below shows the progress of the extractions:

| Extraction No. | Wt. $SO_2$ Used, Grams | Wt. of $SO_2$-Free Extract, Grams | N.N., $SO_2$-Free Extract |
|---|---|---|---|
| 1 | 412 | 11 | 400 |
| 2 | 893 | 51 | 419 |
| 3 | 917 | 40 | 423 |
| 4 | 887 | 14 | 410 |
| 5 | 890 | 6 | 371 |

The residue was 82 grams of free-flowing white crystals having neut. No. of 565 and melting point of 100–105° C. The calculated neut. No. of pure azelaic acid is 596 and its reported melting point is 106.5° C. The molar yield of recovered azelaic acid from the foregoing operations, based on the unsaturated fatty acids available in the tall oil fatty acids, was roughly 45%.

From the foregoing the effectiveness of the $SO_2$ purifying treatment for removing oxygenated contaminants from a composition thereof with one or a mixture of dibasic acids of the oxalic acid series having at least 4 carbon atoms is evident. The term "$C_{4+}$ dibasic acids of the oxalic acid series" is intended herein to describe one or a mixture of such homologous dibasic acids having molecular weight above that of malonic acid.

We claim:

1. A process for purifying dibasic acids of the formula HOOC—$(CH_2)_n$—COOH where $n$ is an integer of a value of at least 2 in a mixture thereof with oxygenated contaminants which comprises extracting said mixture with liquid phase sulfur dioxide, and thereafter separating the resulting magma into an extract fraction and a purified dibasic acid fraction.

2. The process of claim 1 wherein the temperature of the extracting is between about minus 30 and about 100° F., and the weight ratio of liquid sulfur dioxide to said mixture used is between about ½:1 and about 12:1.

3. The process of claim 1 wherein the mixture contains a plurality of said dibasic acids and is obtained from the oxidation of at least one paraffinic hydrocarbon.

4. The process of claim 3 wherein said mixture includes at least one of said dibasic acids having an odd number of carbon atoms and at least one of said dibasic acids having an even number of carbon atoms, and the ratio of liquid sulfur dioxide to said crude mixture used is at least 1:1, thereby promoting solvation of a substantial amount of the dibasic acid having an odd number of carbon atoms in the extract fraction and producing a purified dibasic acid fraction having a lower ratio of dibasic acid having an odd number of carbon atoms to the dibasic acid having an even number of carbon atoms than said crude mixture.

5. The process of claim 1 wherein metalliferous impurities are removed from the mixture of dibasic acids and oxygenated contaminants prior to the extraction of said mixture with liquid phase sulfur dioxide.

References Cited in the file of this patent

UNITED STATES PATENTS

| 1,970,535 | James | Aug. 14, 1934 |
| 2,626,276 | Hibshman | Jan. 20, 1953 |
| 2,724,717 | Hibshman | Nov. 22, 1955 |

FOREIGN PATENTS

| 524,440 | Canada | May 1, 1956 |

OTHER REFERENCES

Noller: "Chemistry of Organic Compounds," 1951, pp. 63 to 65.